(12) United States Patent
Flechsig et al.

(10) Patent No.: US 11,926,703 B2
(45) Date of Patent: Mar. 12, 2024

(54) HOMOGENEOUS POLY(ALKYLENE) GUANIDINES AND METHOD FOR THE PRODUCTION THEREOF

(71) Applicant: Thomas Flechsig, Edlibach (CH)

(72) Inventors: Thomas Flechsig, Edlibach (CH); Frank Flechsig, Wohlen (CH)

(73) Assignee: Thomas Flechsig, Edlibach (CH)

(*) Notice: Subject to any disclaimer, the term of this patent is extended or adjusted under 35 U.S.C. 154(b) by 121 days.

(21) Appl. No.: 16/499,292

(22) PCT Filed: Mar. 27, 2018

(86) PCT No.: PCT/EP2018/057809
§ 371 (c)(1),
(2) Date: Sep. 29, 2019

(87) PCT Pub. No.: WO2018/178093
PCT Pub. Date: Oct. 4, 2018

(65) Prior Publication Data
US 2021/0079159 A1    Mar. 18, 2021

(30) Foreign Application Priority Data
Mar. 28, 2017 (EP) .................... 17000505

(51) Int. Cl.
C08G 73/02    (2006.01)
(52) U.S. Cl.
CPC ............... C08G 73/0213 (2013.01)
(58) Field of Classification Search
None
See application file for complete search history.

(56) References Cited

U.S. PATENT DOCUMENTS

| | | | |
|---|---|---|---|
| 2,325,586 A | 8/1943 | Bolton et al. | |
| 6,455,137 B1 | 9/2002 | Miyamoto et al. | |
| 9,403,944 B2 * | 8/2016 | Lombardi | C08G 73/0206 |
| 2009/0130052 A1 | 5/2009 | Schmidt | |
| 2012/0259064 A1 | 10/2012 | Greiner et al. | |
| 2012/0283664 A1 * | 11/2012 | Riemann | A61L 27/18 |
| | | | 604/264 |

FOREIGN PATENT DOCUMENTS

| | | | |
|---|---|---|---|
| CN | 101173041 A | | 5/2008 |
| CN | 102753160 A | | 10/2012 |
| DE | 102009060249 A1 | | 6/2011 |
| DE | 102009060249 B4 | | 9/2013 |
| EP | 1551903 A1 | | 7/2005 |
| JP | 2000-272236 A | | 10/2000 |
| KR | 19980072767 A | * | 11/1998 |
| RU | 2318803 C1 | * | 3/2008 |
| RU | 2489452 C1 | | 8/2013 |
| WO | 9954291 A1 | | 10/1999 |
| WO | 2004052961 A1 | | 6/2004 |
| WO | 2011131773 A1 | | 10/2011 |

OTHER PUBLICATIONS

CAS substance identity information document submitted by applicant, 3 pages, Dated Nov. 25, 2020.*
English language abstract for DE 102009060249 A1 and B4.
International Search Report for PCT/EP2018/057809 dated Jul. 6, 2018.
Machine Translation for CN 101173041 A (2008).
Lysytsya et al. 2012. Mass-Spectrometry Studies of Oligomeres Composition of Polyhexamethyleneguanidine. Biotechnologia Acta, 5(5), pp. 109-113.
Gurevich et al. (2012). Sintez polygeksametilenguanidin gidrokhlorida lineinogo stroeniya. Vestnik Kazanskogo tekhnologicheskogo universiteta, 15(1), pp. 85-89.
Chinese Office Action dated Sep. 16, 2021.
Eurasian Office Action dated Sep. 29, 2021.
Wei et al. (2012). Condensation between guanidine hydrochloride and diamine/multi-amine and its influence on the structures and antibacterial activity of oligoguanidines. e-Polymers, No. 072, pp. 1-10.
Japanese Office Action dated Dec. 14, 2021.
Zhang et al. (1999). Synthesis and antimicrobial activity of polymeric guanidine and biguanidine salts. Polymer, 40, 6189-6198.
Machine Translation for RU 2489452 C1 (2013).
Indian Office Action dated Apr. 16, 2021.

* cited by examiner

Primary Examiner — Tae H Yoon
(74) Attorney, Agent, or Firm — Caesar Rivise, PC

(57) ABSTRACT

The invention relates to a method for producing poly(alkylene) guanidines, comprising at least the following steps: a) providing an alkylene diamine of the formula $NH_2$—$(CH_2)_m$-$NH_2$ with m=4-12, in particular 6-10, in a reaction vessel and heating the alkylene diamine to a temperature greater than or equal to the melting temperature of the alkylene diamine in question, typically to a temperature in a range of 25° C. to 115° C., preferably 55° C. to 110° C., whereby a melt of the alkylene diamine is produced; b) adding a guanidinium salt, in particular guanidinium HCl, in portions and reacting same with the alkylene diamine until the formation of alkylene(guanidine) monomers is completed; c) reacting the monomers formed in step b), at at least the minimum temperature at which the polymerization to form the desired poly(alkylene) guanidine begins, until the formation of the poly(alkylene) guanidine is completed; wherein steps a) and b) for forming alkylene(guanidine) monomers are carried out at a temperature below the minimum polymerization temperature and the mixture is stirred during all method steps. The invention further relates to the homogeneous poly(alkylene) guanidines obtainable by means of the method described above, said poly(alkylene) guanidines having a content of at least 85 wt %, in particular at least 90% or 97%, of a desired linear poly(alkylene) guanidine having 3-14, preferably 4-10, alkylene monomer units in the molecule as a main product and a content of by-products, in particular branched isomers of said poly(alkylene) guanidine, of at most 15%, 10%, 5% or 3%.

10 Claims, No Drawings

HOMOGENEOUS POLY(ALKYLENE) GUANIDINES AND METHOD FOR THE PRODUCTION THEREOF

CROSS-REFERENCE TO RELATED APPLICATIONS

This application is a U.S. National Phase Application of PCT/EP2018/057809, filed Mar. 27, 2018, which claims priority from DE 17000505.2, filed Mar. 28, 2017, the contents of which applications are incorporated herein by reference in their entireties for all purposes.

BACKGROUND OF THE INVENTION

Various methods for the production of poly(alkylene) guanidines are known in principle and typically include the direct reaction of an alkylene diamine with guanidinium hydrochloride to form polymer at relatively high temperatures above the minimum polymerization temperature for the desired poly(alkylene) guanidine, e.g. approximately at the melting temperature of the guanidinium hydrochloride of 180° C. Such methods are described, for example, in DE 102009060249 A1, WO 1999054291 A1, and DE 102009060249 B4.

It is disadvantageous, for example, in the case of these conventional methods that, as a result of the high reaction temperature and the high viscosity of guanidinium hydrochloride or the reaction mixture at this temperature, on one hand a very pronounced formation of ammonia occurs during the condensation reactions and on the other hand outgassing cannot be performed with sufficient speed and control.

Moreover, in the case of these high temperatures, mixtures of alkylene monomers and various polymer molecules with a small degree of polymerization are in practice simultaneously present as reactants, which results in a large selection of reaction possibilities and a wide spectrum of potential final reaction products.

These and other negative effects lead to not only linear poly(alkylene) guanidines with a desired chain length, but also a high ratio of shorter and longer chains and in particular also a high ratio (typically at least 20%) of branched poly(alkylene) guanidine isomers being formed in the case of the conventional methods.

Heterogeneous products, in particular with a high isomer ratio, are, however, undesirable for many applications since key properties of poly(alkylene) guanidines such as biological degradability, activity, etc. are dependent on structural parameters such as molecule size, isomer ratio, degree of branching, etc. and therefore cannot be reliably predetermined with such a heterogeneous product.

Against this background, the main object of the present invention lies in providing a new method for producing defined poly(alkylene) guanidines with which the described disadvantages of the prior art are largely or entirely avoided and in providing the corresponding homogeneous, in particular low-isomer products.

This object is achieved according to the invention with the provision of the method according to the invention and the poly(alkylene) guanidine products obtained therewith.

More specific aspects and preferred embodiments of the invention are described below.

DESCRIPTION OF THE INVENTION

The method according to the invention for the production of poly(alkylene) guanidines according to the invention comprises at least the following steps:

a) providing an alkylene diamine of the formula $NH_2$—$(CH_2)_m$—$NH_2$ where m=an integer from 4-12 in a reaction vessel and heating of the alkylene diamine to a temperature equal to or above the melting temperature of the respective alkylene diamine, typically to a temperature in a range from 25° C. to 115° C., preferably from 55° C. to 110° C., as a result of which a melt of the alkylene diamine is formed;

b) portion-wise adding of a guanidinium salt (in a solid, in particular particulate form) and reacting with the alkylene diamine until the formation of alkylene(guanidine) monomers is concluded;

c) reacting the monomers formed in step b) at at least the minimum temperature at which the polymerization to the desired poly(alkylene) guanidine begins until the formation of the poly(alkylene) guanidine is concluded;

wherein steps a) and b) for the formation of alkylene (guanidine) monomers are performed at a temperature below the minimum polymerization temperature and all of the method steps are carried out while stirring.

The alkylene diamine used of the formula $NH_2$—$(CH_2)_m$—$NH_2$, where m=an integer of 4-12, in particular 6-10, comprises in particular the representatives with an even number of carbons such as tetramethylenediamine, hexamethylenediamine, octamethylenediamine, decamethylenediamine and dodecamethylenediamine, but is not restricted thereto.

Where desired, a mixture of diamines, e.g. two or more different diamines, with a formula as defined above could also be used.

The guanidinium salt used can in principle be any salt of an organic or, preferably, inorganic acid. This preferably involves a guanidinium phosphate or guanidinium halogenide, particularly preferably guanidinium chloride, which is also referred (in particular commercially) to as guanidinium hydrochloride.

The monomer formation in step b) can in principle be performed at a temperature in the range from 20° C. to 115° C., more specifically at a temperature from 25° C. to 110° C. The temperature typically lies in the range from 41° C. to 110° C., more preferably in the range from 65° C. to 95° C. The optimum reaction temperature is dependent i.a. on the respective alkylene diamine.

For tetramethylenediamine, step b) is preferably performed at a temperature in the range from 20° C. to 70° C.; for hexamethylenediamine preferably at a temperature in the range from 60° C. to 80° C.; for octamethylenediamine preferably at a temperature in the range from 70° C. to 90° C.; and for decamethylenediamine preferably at a temperature in the range from 75° C. to 90° C.

The monomer formation in step b) is typically performed for a period of time of 15 min to 20 h or 25 h, preferably of 30 min to 6 h, until the formation of alkylene(guanidine) monomers is concluded.

The term "alkylene(guanidine) monomers", as used herein, does not comprise any oligomeric or prepolymeric units. Since step b) takes place at a temperature below the minimum polymerization temperature, the formation of larger units, also oligomeric and (pre)polymeric units, is entirely or largely prevented prior to step c).

The minimum polymerization temperature is dependent on the respectively used alkylene diamines and the desired poly(alkylene) guanidine end product. The minimum polymerization temperature is generally at least 120° C.

The conclusion of the monomer formation in step b) is characterized by the end of $NH_3$ formation and $NH_3$ release and can be visually ascertained by the cessation of foaming as a result of NH$_3$ release. Optionally, a vacuum is generated in the reaction vessel for a predetermined period of time in order to promote foaming and thus speed up NH$_3$ release.

Moreover, the conclusion of monomer formation of course can also be determined by analyzing the reaction mixture, for example, (multiple) sample extraction, determining the ratio of the desired monomer product and/or ascertaining the point in time at which this ratio no longer changes.

In one embodiment of the method according to the invention, a pressure is present in the range from 2 mbar to 4000 mbar, preferably from 10 mbar to 1000 mbar, in step b) in the reaction vessel for a period of time in the range from 10 to 240 min, typically from 15 to 90 min.

Optionally, unreacted alkylene diamine can be removed, in particular distilled off, in step b) prior to step c). This preferably also takes place in the presence of vacuum. Suitable conditions can be easily determined by routine tests. For example, the alkylene diamine can be distilled off at a pressure of the reactor of 10 mbar and a temperature of up to 60° C.

Polymerization or more precisely polycondensation in step c) is typically performed for a period of time of 30 min to 25 h, preferably of 30 min to 6 h or 30 min to 10 h.

The conclusion of the formation of the desired poly (alkylene) guanidine can be determined, for example, by analysis of the reaction mixture, e.g. by means of sample extraction and determining the ratio of the desired polymer product (e.g. by LC-MS and/or nitrogen determination as set out in even greater detail below) and/or ascertaining the point in time at which the polymer product is in a desired range in terms of molar mass (in Dalton) and/or chain length (number of monomer units).

The process can be easily optimized and standardized by variation of the reaction times and reaction temperatures within the ranges indicated in the present description so that, by specifying and adjusting these reaction parameters, the desired polymer product can be reproducibly obtained under optimum conditions.

Optionally, the method according to the invention can also comprise after step c) further steps for processing the product, for example, for separating off unreacted starting materials or by-products.

A more specific embodiment of the method according to the invention comprises at least the following steps:
a) providing an alkylene diamine of the formula NH$_2$—(CH$_2$)$_m$—NH$_2$ where m=4-12, in particular 6-10, in a reaction vessel, preferably a pressure reactor, and heating of the alkylene diamine to a temperature equal to or above the melting temperature of the respective alkylene diamine, typically to a temperature in a range from 41° C. to 90° C., preferably of 55° C. to 80° C., as a result of which a melt of the alkylene diamine is formed;
b) portion-wise adding of a guanidinium salt, e.g. of guanidinium hydrochloride, in solid form and reacting with the alkylene diamine while stirring at a temperature in the range from 41° C. to 110° C., preferably from 65° C. to 95° C., for a period of time of 15 min to 25 h, preferably of 30 min to 6 h, until the formation of alkylene(guanidine) monomers is concluded;
c1) heating the monomers formed in step b) while stirring to the minimum temperature at which the polymerization to the desired poly(alkylene) guanidine begins;
c2) keeping the reaction mixture at this temperature for a predetermined period of time, typically in the range from 5 min to 6 h, preferably in the range from 10 to 90 min;
c3) slowly increasing the reaction temperature, typically in steps of approximately 5° C., and after each step keeping the reaction mixture at the respective increased temperature for a predetermined period of time, typically in the range from 5 min to 6 h, preferably in the range from 10 to 90 min;
c4) keeping the reaction mixture at a predetermined maximum temperature for a predetermined period of time, typically in the range from 110 to 180 min, preferably 120 to 160 min;
c5) reducing the temperature of the reaction mixture to a predetermined value below the maximum temperature, but above the minimum temperature for polymerization and keeping the reaction mixture at this temperature for a predetermined period of time;
c6) cooling the reaction mixture to a temperature below the minimum polymerization temperature for the termination of the polymerization, as a result of which the desired homogeneous poly(alkyene) guanidine is directly obtained;
wherein steps a) and b) are performed at a temperature below the minimum polymerization temperature and all method steps a) to c) are performed while stirring.

In the method according to the invention, the molar ratio of alkylene diamine to guanidinium salt typically lies in the range of 1.2:1, more concretely in the range from 1.2:1 to 1:1, preferably 1.1:1 to 1:1, more preferably 1.05:1 or 1.02:1 to 1:1, and is particularly preferably approximately 1:1.

A further aspect of the present invention relates to the homogeneous products which can be obtained with the method according to the invention.

These poly(alkylene) guanidines have a content of at least 85% by weight, typically at least 90%, in particular at least 95% or 97%, of a desired linear poly(alkylene) guanidine with 3-14, preferably 4-10 or 6-8, alkylene monomer units in the molecule as the main product and a content of by-products, in particular branched isomers of this poly (alkylene) guanidine, of at most 15% (also referred to in this application as "isomer-reduced product" in terms of isomer ratio), 10% ("low-isomer" product), 5% or 3% ("isomerically pure" product).

In contrast to this, poly(alkylene) guanidines which are obtained with the usual methods of the prior art generally have a significantly higher isomer content (typically above 20%, in individual cases even up to 70% isomers).

In a more specific embodiment of the method according to the invention, poly(alkylene) guanidines are produced which have a molecular weight average in the range from 500 to 15,000, in particular from 500 to 5000 Dalton, wherein at most 15%, preferably at most 10%, and particularly preferably at most 3% of the polymer molecules have a molecular weight outside the respective molecular weight average.

EXAMPLE 1

Production and Characterization of a Poly(Hexamethylene)Guanidine

The reactants hexamethylenediamine (HMDA) and guanidinium hydrochloride (GHC) were weighed out in a molar ratio of 1:1.

HMDA was filled into a reactor and GHC in powder or crystalline form was introduced into the receiver. The reactor was heated to an internal temperature IT of 60° C. and the stirrer was activated upon complete melting of the HMDA. When this IT temperature was reached, the temperature control was set to 65° C. with the stirrer running.

GHC was metered from the receiver at a constant temperature. The formation of ammonia began immediately. Foaming and temperature were controlled and, optionally, metering was varied and/or cooling was used. The reactor temperature was not supposed to leave the range from 60° C. to 80° C. and preferably supposed to lie in the range of 60-70° C.

After termination of GHC metering, the foaming significantly reduced and the temperature settled to 65° C. After increasing the stirrer speed and applying a vacuum of 10 mbar to 950 mbar, preferably 200 mbar to 600 mbar, slight foaming started again. As soon as the pressure was constant and no foaming or bubble formation was visible, the temperature was increased to IT 80° C. and the stirrer speed increased to maximum. After 20 min, the vacuum was removed and the stirrer speed was reduced again. Monomer formation was now concluded.

A sample was extracted from the reactor content and the HMDA content was determined. In the case of an excessive residual HDMA content, the pressure of the reactor can be reduced to, for example, 10 mbar and the HMDA be distilled off at a temperature of up to 60° C.

For polymerization, the temperature was increased to a temperature IT of 120° C. with the stirrer in operation and maintained at a constant temperature for 1 h. A slow increase in temperature in steps of 5° C. up to 140° C. was then effected, wherein the temperature was maintained for 30 min at each step. At 140° C., the reaction was stirred vigorously for 2 h. The temperature was then further increased to 150° C. in steps of 5° C. The temperature was maintained for 1 h after the first step, then kept at 150° C. for a further 2 h and the stirrer speed was increased. The temperature was then reduced to 120° C. and maintained there for 1 further hour.

In order to terminate polymerization, cooling was performed to an IT of below 95° C. with maximum stirring.

The product was characterized by means of LC-MS and nitrogen determination.

The theoretical nitrogen ratio ("N setpoint") for the "ideal" (linear) polymer with a predefined molecular weight average and degree of polymerization and for corresponding branched isomers can be calculated on the basis of the respective structure formulae and compared with the actual nitrogen ratio of the obtained polymer (N actual). The theoretical nitrogen ratio of the isomers is always higher and the level of excess nitrogen (relative to N setpoint) therefore represents a measure for the respective isomer ratio.

The following tables show characteristic product parameters of various samples in comparison.

The samples designated as Laboratory Test 1 and Laboratory Test 2 were obtained with the method according to the invention, the other samples with various conventional methods. The key method parameters are also indicated in Table 1.

TABLE 1

Determination of the average degree of polymerization with LC-MS, MALDI-TOF, GC

| Sample | Method Reactants Reaction State of Aggregation | Temperature Melt | Temperature Monomer | Temperature Max Temp | Time Total Hours | Polymer Min/Max/-Average |
|---|---|---|---|---|---|---|
| Laboratory Test 1 | HMDA liquid/ GHC solid | 55 | 70 | 150 | 6 | n4/n8/n6 |
| Laboratory Test 2 | HMDA liquid/ GHC solid | 55 | 65 | 145 | 8 | n3/n8/n5 |
| China Powder 1000 | HMDA liquid/ GHC liquid | 180 | 180 | 210 | 7 | n4/n11/n6 |
| China Crystal 1000 | HMDA liquid/ GHC liquid | 180 | 140 | 190 | 6 | n4/n10/n6 |
| Laboratory Test 36/182 | HMDA liquid/ GHC liquid | 180 | 130 | 190 | 5 | n27/n199/n72 |
| Laboratory Test 36/184 | HMDA liquid/ GHC liquid | 180 | 130 | 230 | 5 | n32/n240/n82 |
| Laboratory Test 36/192 | HMDA liquid/ GHC liquid | 180 | 130 | 190 | 3 | n16/n160/n54 |

TABLE 2

Comparison of the theoretical nitrogen ratio (N setpoint) for the "ideal" (linear) polymer with the indicated molecular weight average and degree of polymerization with the actual nitrogen ratio of the obtained polymer (N actual), as measured by means of DumaTherm (DUMATHERM ® rapid nitrogen determination in accordance with DUMAS from the manufacturer Gerhardt) with 1 g polymer

| Sample | Reactants Reaction State of Aggregation | N setpoint | N actual | Polymer Mw D |
|---|---|---|---|---|
| Laboratory Test 1 | HMDA liquid/ GHC solid | 245.72 | 281.3 | 1083.30 |
| Laboratory Test 2 | HMDA liquid/ GHC solid | 247.53 | 265.8 | 905.60 |
| China Powder 1000 | HMDA liquid/ GHC liquid | 245.72 | 378.2 | 1083.30 |
| China Crystal 1000 | HMDA liquid/ GHC liquid | 245.72 | 344.6 | 1083.30 |
| Laboratory Test 36/182 | HMDA liquid/ GHC liquid | 237.30 | 316.2 | 12,811.44 |
| Laboratory Test 36/184 | HMDA liquid/ GHC liquid | 237.21 | 321.8 | 14,588.44 |
| Laboratory Test 36/192 | HMDA liquid/ GHC liquid | 237.56 | 324.6 | 9612.84 |

TABLE 3

Derivation of the respective ratio of isomers and (linear)
polymer on the basis of the measured nitrogen excess
as a function of the degree of polymerization

| Sample | Reactants Reaction State of Aggregation | Polymer % | Isomer % | Polymer Mw D |
|---|---|---|---|---|
| Laboratory Test 1 | HMDA liquid/ GHC solid | 85.52% | 14.48% | 1083.30 |
| Laboratory Test 2 | HMDA liquid/ GHC solid | 92.62% | 7.38% | 905.60 |
| China Powder 1000 | HMDA liquid/ GHC liquid | 46.09% | 53.91% | 1083.30 |
| China Crystal 1000 | HMDA liquid/ GHC liquid | 59.76% | 40.24% | 1083.30 |
| Laboratory Test 36/182 | HMDA liquid/ GHC liquid | 66.75% | 33.25% | 12,811.44 |
| Laboratory Test 36/184 | HMDA liquid/ GHC liquid | 64.34% | 35.66% | 14,588.44 |
| Laboratory Test 36/192 | HMDA liquid/ GHC liquid | 63.36% | 36.64% | 9612.84 |

It is apparent that the samples obtained with the method according to the invention have a significantly lower isomer ratio than the conventional samples.

The invention claimed is:

1. A method for the production of poly(alkylene) guanidines, comprising at least the following steps:
   a) providing an alkylene diamine of the formula $NH_2$—$(CH_2)_m NH_2$ where m=4-12, in a reaction vessel and heating of the alkylene diamine to a temperature equal to or above a melting temperature of the alkylene diamine, as a result of which a melt of the alkylene diamine is formed;
   b) portion-wise adding of a guanidinium salt and reacting with the alkylene diamine until formation of alkylene (guanidine) monomers is concluded, wherein the formation of the alkylene(guanidine) monomers can be ascertained to be concluded by a cessation of foaming as a result of $NH_3$ release and a vacuum is generated in the reaction vessel for a predetermined period of time in order to promote foaming, and optionally any unreacted alkylene diamine is distilled off prior to step c);
   c) reacting the monomers formed in step b) at at least a minimum polymerization temperature at which a polymerization to a desired poly(alkylene) guanidine begins, with the minimum polymerization temperature being at least 120° C., until a formation of the poly (alkylene) guanidine is concluded;
   wherein a molar ratio of alkylene diamine to guanidinium salt lies in a range from 1.2:1 to 1:1, and steps a) and b) for the formation of alkylene(guanidine) monomers are performed at a temperature within a range from 25° C. to 115° C., and all of the steps are carried out while stirring,
   wherein step (b) is conducted while stirring at a temperature in a range from 41° C. to 110° C., for a period of time of 15 mm to 25 h, until the formation of alkylene (guanidine) monomers is concluded, and wherein step (c) comprises the following steps;
   c1) heating the monomers formed in step b) while stirring to the minimum temperature at which the polymerization to the desired poly(alkylene) guanidine begins;
   c2) keeping the reaction mixture at this temperature for a predetermined period of time;
   c3) slowly increasing the reaction temperature in steps, and after each increasing step keeping the reaction mixture at the respective increased temperature for a predetermined period of time;
   c4) keeping the reaction mixture at a predetermined maximum temperature for a predetermined period of time;
   c5) reducing the temperature of the reaction mixture to a predetermined value below the maximum temperature, but above the minimum temperature for polymerization and keeping the reaction mixture at this temperature for a predetermined period of time; and
   c6) cooling the reaction mixture to a temperature below the minimum polymerization temperature for the termination of polymerization, as a result of which the desired homogeneous poly(alkyene) guanidine is directly obtained.

2. The method according to claim 1, wherein step c) is performed for a period of time of 30 min to 25 h.

3. The method according to claim 1, wherein the alkylene diamine is tetramethylenediamine, and the minimum polymerization temperature is 120° C.

4. The method according to claim 1, wherein the alkylene diamine is hexamethylenediamine, octamethylenediamine or decamethylendiamine, the monomer formation is performed in step b) at a temperature in the range from 55° C. to 110° C., and the minimum polymerization temperature is 120° C.

5. The method according to claim 4, wherein the temperature at which monomer formation in step (b) is performed is 60° C. to 80° C. when the alkylene diamine is hexamethylenediamine, 70° C. to 90° C. when the alkylene diamine is octamethylenediamine, and 75° C. to 90° C. when the alkylene diamine is decamethylenediamine.

6. The method according to claim 1, wherein a pressure is present in a range from 2 mbar to 4000 mbar, in step b) in the reaction vessel for a period of time in a range from 10 to 240 min.

7. The method according to claim 1, wherein the molar ratio of alkylene diamine to guanidinium salt is from 1.1:1 to 1:1.

8. The method according to claim 1, wherein the molar ratio of alkylene diamine to guanidinium salt is about 1:1.

9. The method according to claim 1, wherein a reaction product of the method comprises at least 85% by weight of linear poly(alkylene) guanidines comprising 4-10 alkylene monomer units and up to 15% by weight of byproducts.

10. The method according to claim 9, wherein step c) is conducted within a temperature range from 120° C. to 150° C.

* * * * *